(12) United States Patent
Kim et al.

(10) Patent No.: US 6,344,080 B1
(45) Date of Patent: Feb. 5, 2002

(54) PROTECTION FILM COMPOSITION FOR PLASMA DISPLAY PANEL

(75) Inventors: Jeong Jun Kim, Kyongsangbuk-do; Sung Ho Woo, Taegu; Hee Kwon Chae, Kyonggi-do; Chang Woo Park, Taejon, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/570,786

(22) Filed: May 15, 2000

(30) Foreign Application Priority Data

Nov. 18, 1999 (KR) ............................................. 99-49264

(51) Int. Cl.[7] ............................................. C04B 35/04
(52) U.S. Cl. ............................... 106/287.23; 106/382.18
(58) Field of Search .................. 106/287.18, 287.23

(56) References Cited

U.S. PATENT DOCUMENTS 6,126,743 A * 10/2000 Saegusa et al. ............... 117/68

OTHER PUBLICATIONS

Matsuki et al, "Formation of modified lead titanate zirconate thin film", CAPLUS 1990:622934, Abstract of JP 01260870, Oct. 18, 1989.*

Turova et al, "Metal 2–methoxy ethoxides", CAPLUS 1992:502839, 1992.*

* cited by examiner

*Primary Examiner*—David Brunsman
(74) *Attorney, Agent, or Firm*—Fleshner & Kim, LLP

(57) ABSTRACT

Protection film composition for a plasma display panel consisting of a metal oxide including 60 wt %~90 wt % of magnesium 2-methoxyethoxide, and 10 wt %~40 wt % of metal polyoxohydroxide, and an organic solvent, thereby enhancing a luminance, reducing a discharge current and discharge voltage required for providing the same luminance, and permitting to form an excellent magnesium oxide thin film having no pin hole, crack, and excellent electric characteristics.

14 Claims, 10 Drawing Sheets

PROTECTION FILM COMPOSITION FOR PLASMA DISPLAY PANEL

BACKGROUND OF THE INVENTION

1. Field of the Invention

The present invention relates to a plasma display panel, and more particularly, to protection film composition for a plasma display panel.

2. Background of the Related Art

Having all the advantages of the clear picture and the variety of screen sizes of cathode ray tubes, and the light and thin liquid display panel, the plasma display panel is considered as the next generation display. In general, the plasma display panel has a weight approx. ⅓ of the cathode ray tube of the same screen size, and a thickness below 10 cm even for a large sized panel of 40 to 60". Moreover, though the cathode ray tube and the liquid crystal display have problems coming from a limitation on a size in displaying a digital data picture and a full motion on the same time, the plasma display panel has no such problems. And, while the cathode ray tube is influenced from a magnetic force, the plasma display panel is not influenced from the magnetic force, permitting to provide a stable picture to the watchers. And, since the pixels are controlled in a digital fashion, with no distortion of images at corners of the screen, the plasma display panel can provide a picture quality better than the cathode ray tube. The plasma display panel is provided with two glass substrates having electrodes coated thereon perpendicular, and opposite to each other. There are pixels at portions the electrodes are crossed. The operation of the plasma display panel is almost identical to the operation principle of a domestic fluorescent lamp.

Referring to FIG. 1A, a related art triode surface discharge type plasma display panel has an upper substrate 10 and a lower substrate 20 bonded together to face each other. FIG. 1B illustrates a section of the plasma display panel shown in FIG. 1A, wherein a surface of the lower substrate 20 is rotated by 90° for convenience of explanation. The upper substrate 10 has scan electrodes 16 and 16' and sustain electrodes 17 and 17' formed parallel to each other, a dielectric layer 11 coated on the scan electrodes 16 and 16' and the sustain electrodes 17 and 17', and a protection film 12. The lower substrate 20 has address electrodes 22, a dielectric film 21 on an entire surface of the substrate including the address electrodes 22, partition walls on the dielectric film 21 between the address electrodes 22, and a fluorescent material coating 24 on surfaces of the partition wall 23 and the dielectric film 21 in each discharge cell. A space between the upper and lower substrates 10 and 20 is filled with a mixture of inert gas, such as helium He and xenon Xe, to a pressure in a range of 400~500 Torr, to form a discharge space. In general, the inert gas filled in the discharge space of a D.C. plasma display panel is a mixture of helium and xenon (He—Xe), and the inert gas filled in the discharge space of an A.C. plasma display panel is a mixture of neon and xenon (Ne—Xe).

Referring to FIG. 2A and 2B, the scan electrodes 16 and 16' and the sustain electrodes 17 and 17' are provided with transparent electrodes 16 and 17 and bus electrodes 16' and 17' of a metal for enhancing light transmission of each discharge cell. FIG. 2A illustrates a plan view of the sustain electrode 17 and 17' and the scan electrode 16 and 16', and FIG. 2B illustrates a section of the sustain electrode 17 and 17' and the scan electrode 16 and 16'. The bus electrodes 16' and 17' are provided with a discharge voltage from a driving IC fitted outside of the panel, and the transparent electrodes 16 and 17 are provided with the discharge voltage to the bus electrodes 16' and 17', to cause a discharge between adjacent transparent electrodes 16 and 17. The transparent electrode 16 and 17 has a total width of approx. 300 μm of indium oxide or tin oxide, and the bus electrode 16' and 17' is a thin film having three layers of chrome-copper-chrome. A width of the bus electrode 16' and 17' line has approx. ⅓ of a width of the transparent electrode 16 and 17 line.

FIG. 3 illustrates wiring of the scan electrodes Sm−1, Sm, Sm+1, - - - , Sn−1, Sn, Sn+1 and the sustain electrodes Cm−1, Cm, Cm+1, - - - , Cn−1, Cn, Cn+1 arranged on the upper substrate, wherein, while the scan electrodes are discontinuous between each other, all the sustain electrodes are connected in parallel. In FIG. 3, the section enclosed by the dashed line represents an effective surface a picture is displayed thereon, and the other section represents a non-effective surface no picture is displayed thereon. The scan electrodes on the non-effective surface are in general called dummy electrodes 26, a number of which are not particularly limited.

The operation of the aforementioned triode surface discharge type A.C. plasma display panel will be explained with reference to FIGS. 4A~4D.

Referring to FIG. 4A, when a driving voltage is applied between the address electrode and the scan electrode, an opposed discharge is occurred between the address electrode and the scan electrode. The opposed discharge excites the inert gas in the discharge cell momentarily, to generate ions as the inert gas transits to a ground state, again. As shown in FIG. 4B, a portion of the ions, or atoms in quasi-excited states collide onto a surface of the protection film, which causes emission of secondary electrons from the surface of the protection film. The secondary electrons collide with the gas in a plasma state, to spread the discharge. As shown in FIG. 4C, when the opposed discharge between the address electrode and the scan electrode ends, wall charges with opposite polarities are generated on surfaces of the protection film over the sustain electrode and the scan electrode, respectively. And, as shown in FIG. 4D, when the driving voltage provided to the address electrode is cut off during the wall charges with opposite polarities build up at the scan electrode and the sustain electrode continuously, there is a surface discharge occurred in a discharge region on a surface of the dielectric layer and the protection layer due to a potential difference between the scan electrode and the sustain electrode. These opposed discharge and the surface discharge cause electrons in the discharge cell to collide onto the inert gas in the discharge cell, to generate an UV ray of 147 nm wavelength in the discharge cell as the inert gas is excited. The UV ray collide onto the fluorescent material coated on the address electrode and the partition wall, to excite the fluorescent material, which generates a visible light, that permits to implement a picture on the screen.

In order to make the plasma display panel to have a high commercial preference as a wall mounting type large sized display in view of technology, the plasma display panel should have a luminance and a lifetime, not inferior to the CRT. Particularly, the AC type plasma display panel is provided with a magnesium oxide MgO thin film for preventing damage to the dielectric layer and emitting the secondary electrons that drops the discharge voltage. In general, though the magnesium oxide is deposited on the dielectric layer by PVD, the PVD has a slow rate and costs high. Other than the PVD, there are a few methods for forming the magnesium oxide thin film in the plasma display panel, such as a method disclosed in the Society of Japanese Television IDY94-14, PP1-6, wherein formation of the protection film by screen printing a paste including magnesium oxide powder is suggested. However, the magnesium oxide protection film formed by this method has problems in that application to a front panel is not possible because the protection film is not transparent, and the pin holes formed in the protection film during coating shortens a lifetime. In order to prevent the formation of the pin holes in a thick film coating of the magnesium oxide, there is a method disclosed in Japanese Laid Open Patent Nos. H7-147136, and H8-77933, in which use of a mixture of magnesium oxide powder and a binder which is converted into magnesium oxide by baking, such as magnesium ethoxide, magnesium methoxide, magnesium n-propoxide, magnesium n-butoxide, magnesium methoxypropylate and the like is suggested. The foregoing method using a binder in a mixture has problems in that the magnesium alkoixde susceptible to moist deteriorates solution stability, and the great grain size of the magnesium oxide powder impedes formation of a transparent protection film. Other than the above method, Japanese Laid Open Patent No. H8-329844 discloses a method in which magnesium methoxide is dissolved in ethanol amine and added with a solvent, such as ethylene glycol, to form a coating composition, the coating composition is coated and baked, to form the magnesium oxide protection film. However, the magnesium oxide protection film obtained thus has problems of protection film damage and short lifetime caused by crack coming from separation of organic ligand, with a subsequent reduction of mass and contraction of the thin film.

SUMMARY OF THE INVENTION

Accordingly, the present invention is directed to protection film composition for a plasma display panel that substantially obviates one or more of the problems due to limitations and disadvantages of the related art.

An object of the present invention is to provide protection film composition for a plasma display panel, which can form a magnesium oxide protection film which is transparent, has a high strength and a high bonding force, and forms no pin hole or crack.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the protection film composition for a plasma display panel consisting of a metal oxide including 60 wt %~90 wt % of magnesium 2-methoxyethoxide, and 10 wt %~40 wt % of metal polyoxohydroxide which may be expressed in a general formula $M_xO_y(OH)_{2x-2y}$ (where x is '1', and y is '0' or '1'), and an organic solvent.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1A:
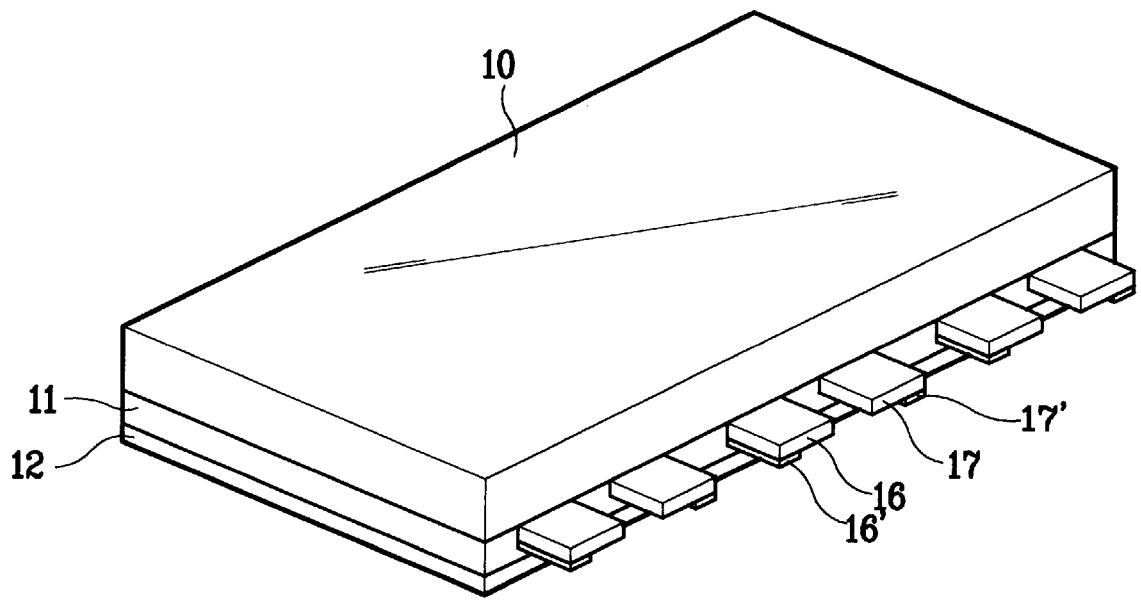
FIGS. 1A and 1B illustrate a perspective view and a section showing a related art plasma display panel.
Figure 1A:
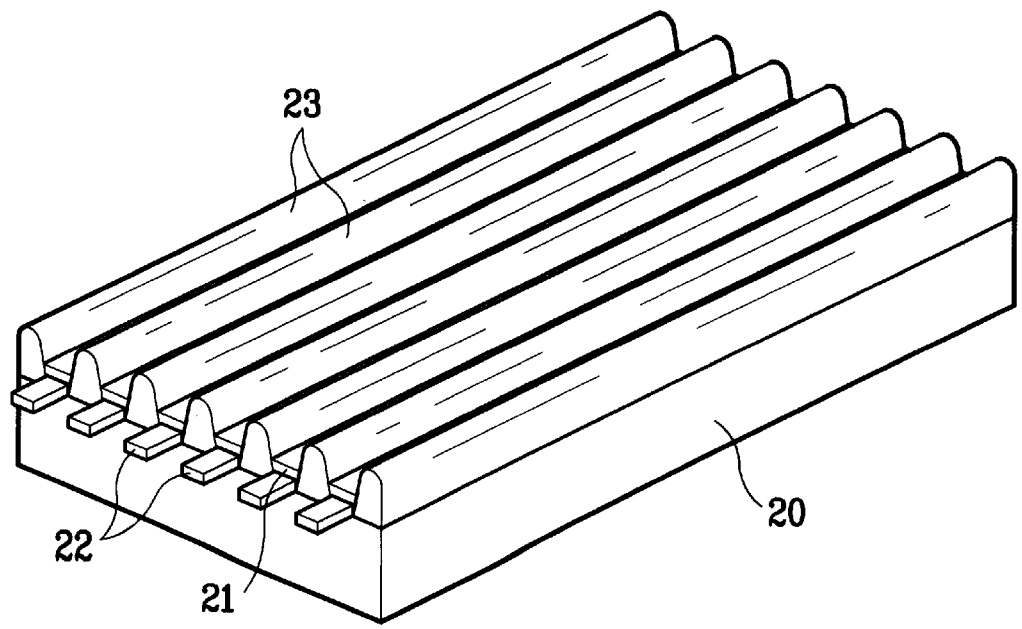
Figure 1B:
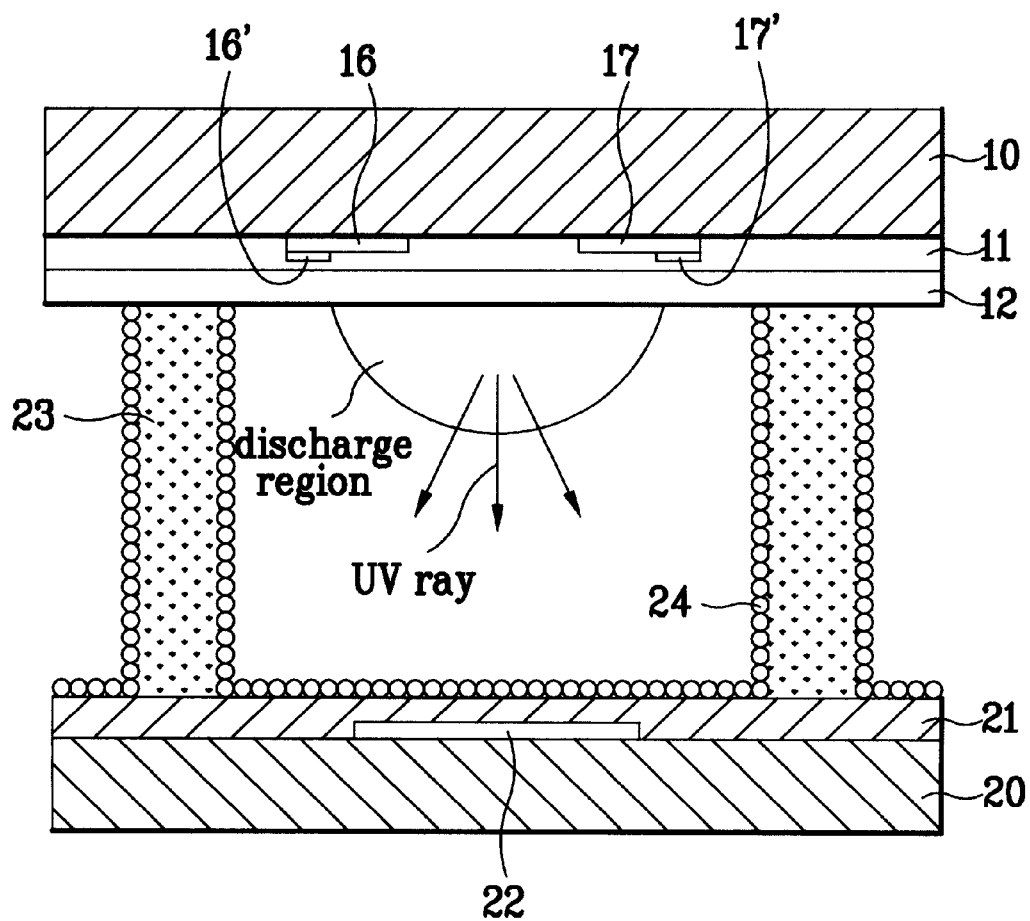
Figure 2A:
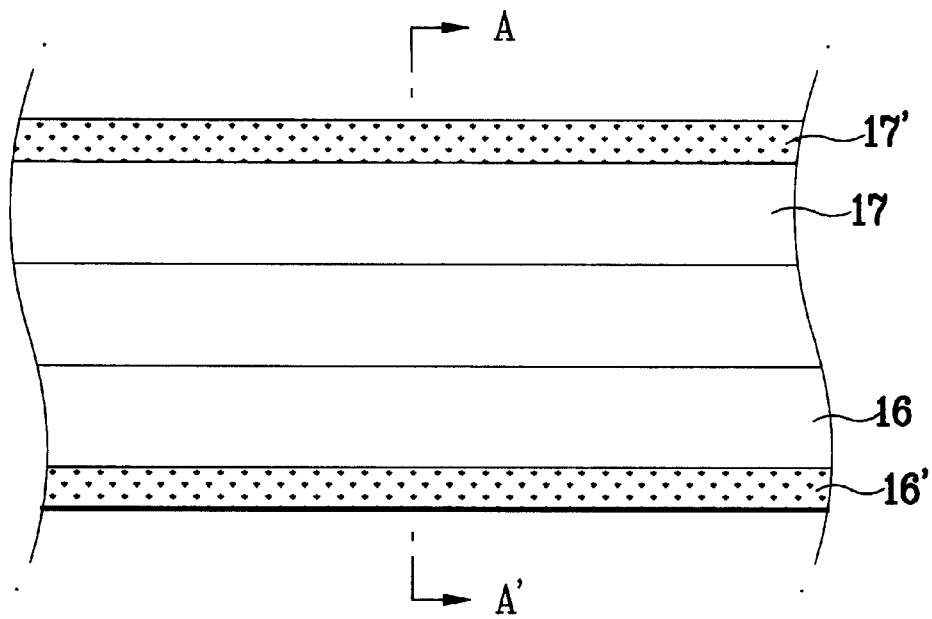
FIGS. 2A and 2B illustrate plan views showing structures of scan electrodes and sustain electrodes in a plasma display panel.
Figure 2B:
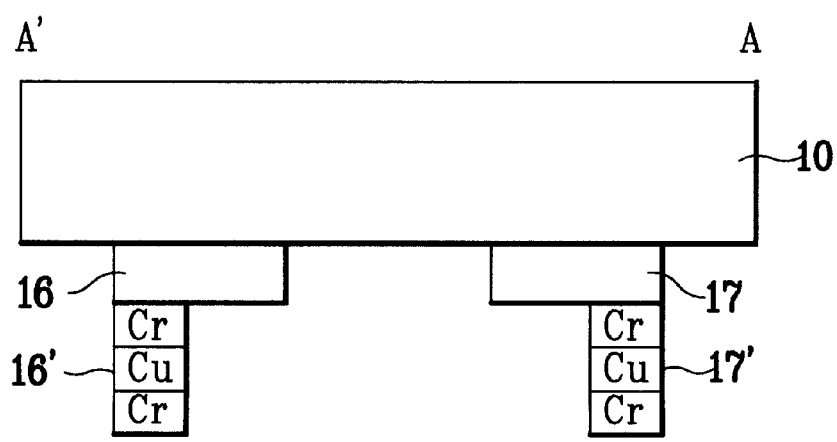
Figure 3:
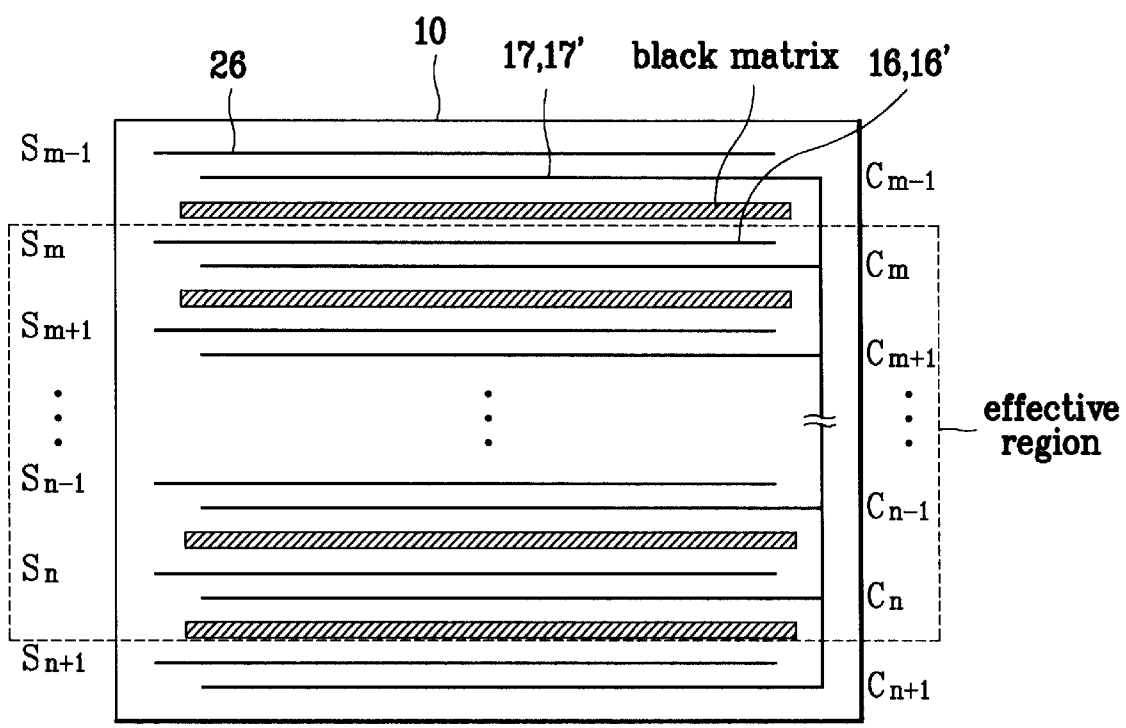
FIG. 3 illustrates a plan view showing wiring of scan electrodes and sustain electrodes in a plasma display panel.
Figure 4A:
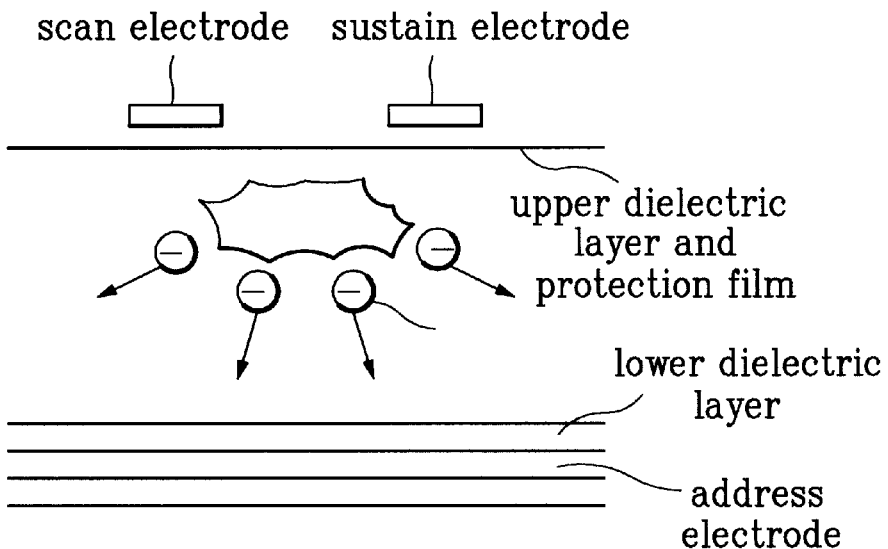
FIGS. 4A and 4D illustrate sections showing a discharge principle of a plasma display panel.
Figure 4B:
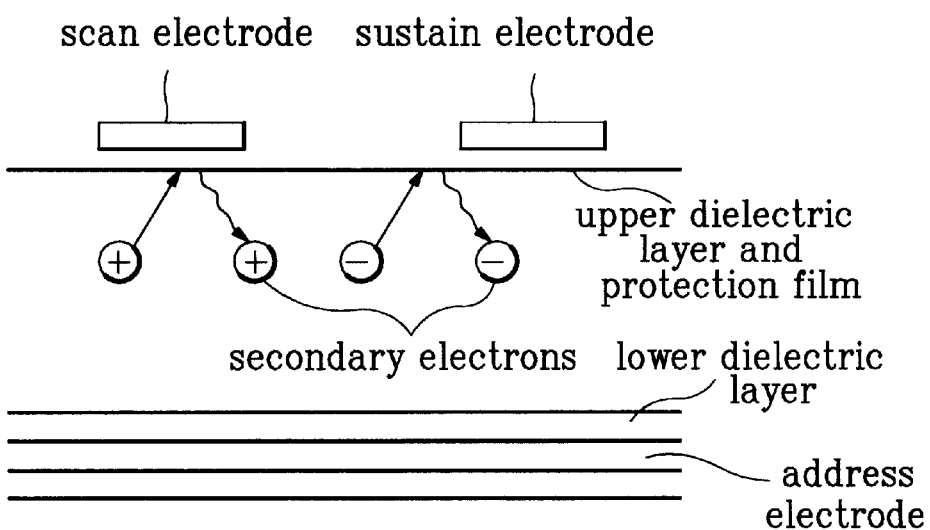
Figure 4C:
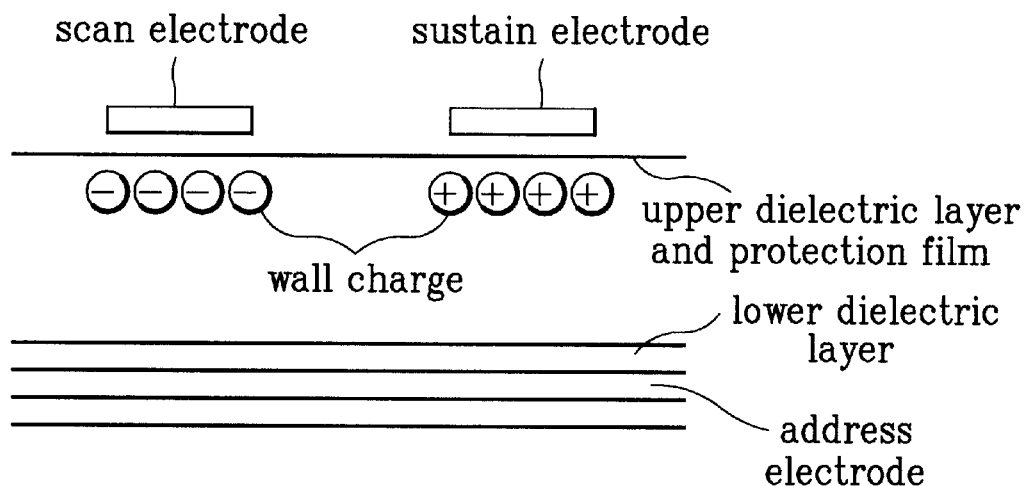
Figure 4D:
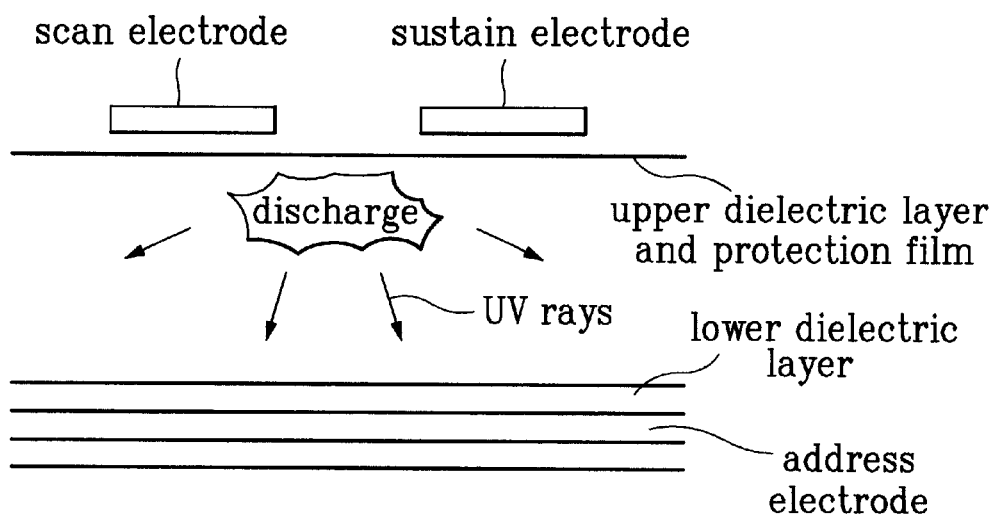

Reference will now be made in detail to the preferred embodiments of the present invention, examples of which are illustrated in the accompanying drawings. Table 1 shows temperatures at which metal alkoxides or metal carbonates are turned into metal oxides, where T1 denotes a temperature at which the alkoxide, or a remaining organic solvent decomposes, and T2 denotes a temperature at which a metal carbonate or amorphous metal oxide is turned into a crystalline metal oxide. In the case of a methoxide$(OMe)_2$, points at which temperatures change clearly are in the proximity of 190° C., 380° C. and 410° C. Methoxide starts to turn into a crystalline magnesium oxide(MgO) at a temperature ranging 383° C.~410° C. and turns into the crystalline magnesium oxide(MgO) completely at a temperature 440° C.

TABLE 1

|    | $Mg(OMe)_2$ | $Mg(OEt)_2$ | $Mg(O^iPr)_2$ | $Mg(O^tBu)_2$ | $Mg(MC)_2$ | $Ca(MC)_2$ | $Sr(MC)_2$ | $Ba(MC)_2$ |
|----|---|---|---|---|---|---|---|---|
| T1 | 190 | 140 | 270 | 250 (br) | 190~270 (br) | ~500 | 132~600 | 340~400 |
| T2 | 382 410 (sh) | 380 450 (sh) | 442 | 404 | 428 | 823 | 927 | 926 |

In table 1, (OMe) denotes a methoxide group, (OEt) denotes an ethoxide group, (O$^i$Pr) denotes an isopropoxide group, O$^t$Bu denotes a t-butoxide group, and (MC) denotes a 2-methoxide group. As described, most of the magnesium alkoxide is turned into a crystalline magnesium oxide(MgO) at 500° C. If it is intended to lower the temperature at which the magnesium alkoxide is turned into the crystalline magnesium oxide, a magnesium alkoxide of selective sol-gel precursor should be employed. Of the alkoxides shown in table 1, the most effective precursors are magnesium butoxide, magnesium methoxide(Mg(OCH$_3$)$_2$, or magnesium 2-methoxyethoxide. Particularly, magnesium butoxide, and magnesium methoxide(Mg(OCH$_3$)$_2$ have stabilities on humidity poorer than magnesium 2-methoxyethoxide(Mg (MC)$_2$, to deposit in a form of powder from a liquid phase by hydrolysis. Therefore, in a sol-gel process, no pure alkoxide precursor is used, but a mixture of magnesium 2-methoxyethoxide(Mg(MC)$_2$ and alkoxide precursor is used. The composition of the present invention having magnesium 2-methoxyethoxide(Mg(MC)$_2$ may be embodied in a variety of embodiments according to composition of the metal oxide and a mixing ratio. The following embodiments are sorted by kinds and amounts of metal polyoxohydroxides and other additives added to magnesium 2-methoxyethoxide[Mg(MC)$_2$], which is employed as a base substance.

FIRST EMBODIMENT

In the first embodiment of the present invention, magnesium hydroxide[Mg(OH)$_2$] is employed as the metal polyoxohydroxide in the composition. That is, in a general formula, M stands for magnesium Mg, 'x' is 1, and 'y' is 0.

SECOND EMBODIMENT

Alike the first embodiment, in the second embodiment of the present invention too, magnesium hydroxide[Mg(OH)$_2$] is employed as the metal polyoxohydroxide in the composition, and magnesium oxide MgO is added by below 30 wt % of total metal oxide in an organic solvent.

THIRD EMBODIMENT

Alike the second embodiment, in the third embodiment of the present invention too, magnesium hydroxide[Mg(OH)$_2$] is employed as the metal polyoxohydroxide in the composition, magnesium oxide MgO is added by below 30 wt % of total metal oxide in an organic solvent, and calcium hydroixde Ca(OH)2 is added by 5 wt % to 20 wt % of total metal oxide, perferably, by 10 wt %.

FOURTH EMBODIMENT

Alike the second embodiment, in the fourth embodiment of the present invention too, magnesium hydroxide[Mg(OH)$_2$] is employed as the metal polyoxohydroxide in the composition, magnesium oxide MgO is added by below 30 wt % of total metal oxide in an organic solvent, and barium hydroixde Ba(OH)2 is added by 5 wt % to 20 wt % of total metal oxide, perferably, by 10 wt %.

FIFTH EMBODIMENT

Alike the first embodiment, in the fifth embodiment of the present invention too, though magnesium hydroxide[Mg (OH)$_2$] is employed as the metal polyoxohydroxide in the composition, different from the second to fourth embodiments, no magnesium oxide MgO is added, but calcium hydroixde Ca(OH)2 is added by 5 wt % to 20 wt % of total metal oxide, perferably, by 10 wt %.

SIXTH EMBODIMENT

Alike the first embodiment, in the sixth embodiment of the present invention too, though magnesium hydroxide[Mg (OH)$_2$] is employed as the metal polyoxohydroxide in the composition, different from the second to fourth embodiments, no magnesium oxide MgO is added, but barium hydroixde Ba(OH)2 is added by 5 wt % to 20 wt % of total metal oxide, perferably, by 10 wt %.

SEVENTH EMBODIMENT

In the seventh embodiment of the present invention, calcium hydroxide[Ca(OH)$_2$] is employed as the metal polyoxohydroxide in the composition, preferably, by 10 wt % of a total metal oxide.

The composition in first to seventh embodiments tend to crystallize into magnesium oxide at a temperature in a proximity of 400° C. Table 2 below shows crystallizing temperatures of the composition of the present invention.

TABLE 2

| composition | 1$^{st}$ embodiment | 3$^{rd}$ embodiment | 5$^{th}$ embodiment |
| --- | --- | --- | --- |
| crystallizing temp. (° C.) | 402 | 402 | 412 |

Figure 5:
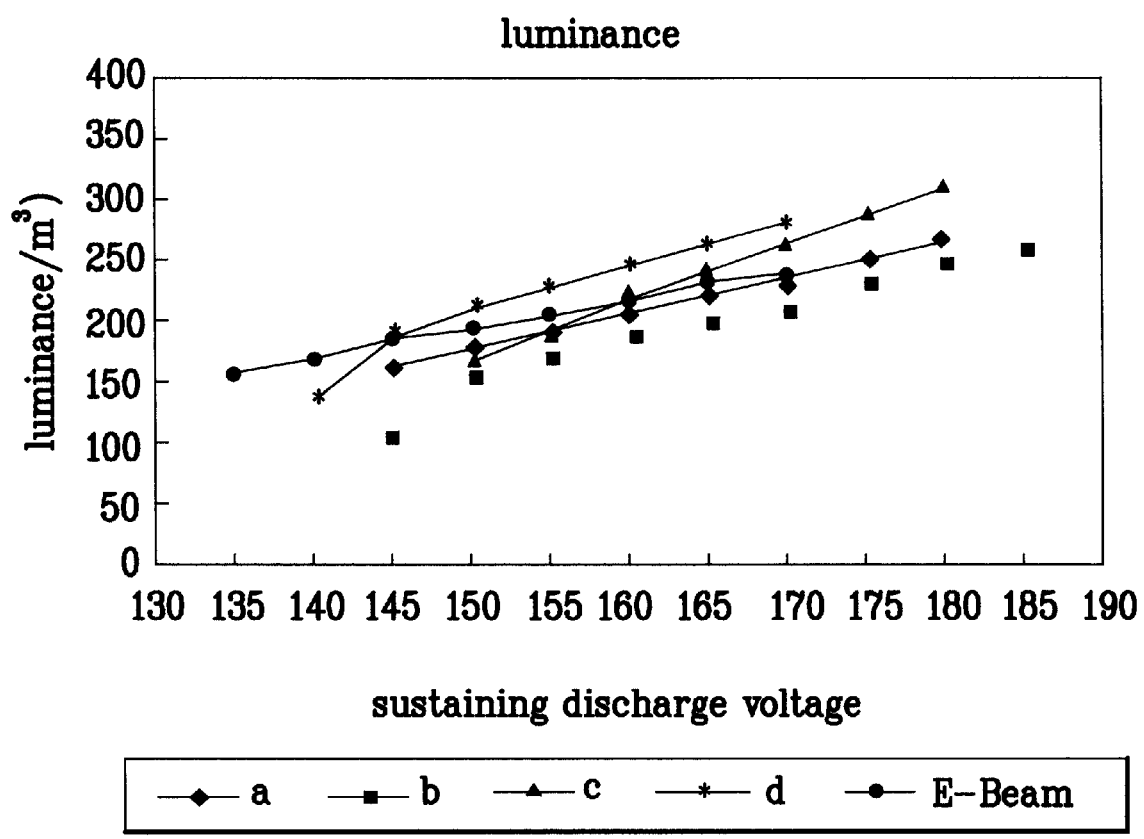
FIG. 5 illustrates a graph showing a luminance vs. a sustain voltage of a plasma display panel employing protection films of the present invention and the related art, respectively.

Of the various aforementioned embodiments of the present invention, luminance of panels on each of which a magnesium oxide protection film is formed according to the first to third and the fifth embodiments is shown in a graph in FIG. 5. In FIGS. 5 to 8, 'a' represents a plasma display panel having a protection film formed according to the third embodiment, 'b' according to the first embodiment, 'c' according to the second embodiment, and 'd' according to the fifth embodiment. 'e' in FIG. 5 illustrates characteristics of a plasma display panel having a related art protection film formed by using an E-beam.

Referring to FIG. 5, it can be known that, though the plasma display panel having a protection film formed according to the first embodiment shows a luminance lower than other embodiment plasma display panels at a sustaining discharge voltage of 145 volts, the first embodiment plasma display panel exhibits a luminance sharply increased when the sustaining discharge voltage is boosted to over 150 volts. On the other hand, though the plasma display panel having a related art protection film formed by using an E-beam exhibits a luminance higher than the same of the other embodiments, the E-beam formed plasma display panel exhibits a luminance increased moderately even if the sustaining discharge voltage is boosted higher than 150 volts, such that the E-beam formed plasma display panel exhibits a luminance lower than the same of the second embodiment at 170 volt of sustaining discharge voltage, on the contrary.

Figure 6:
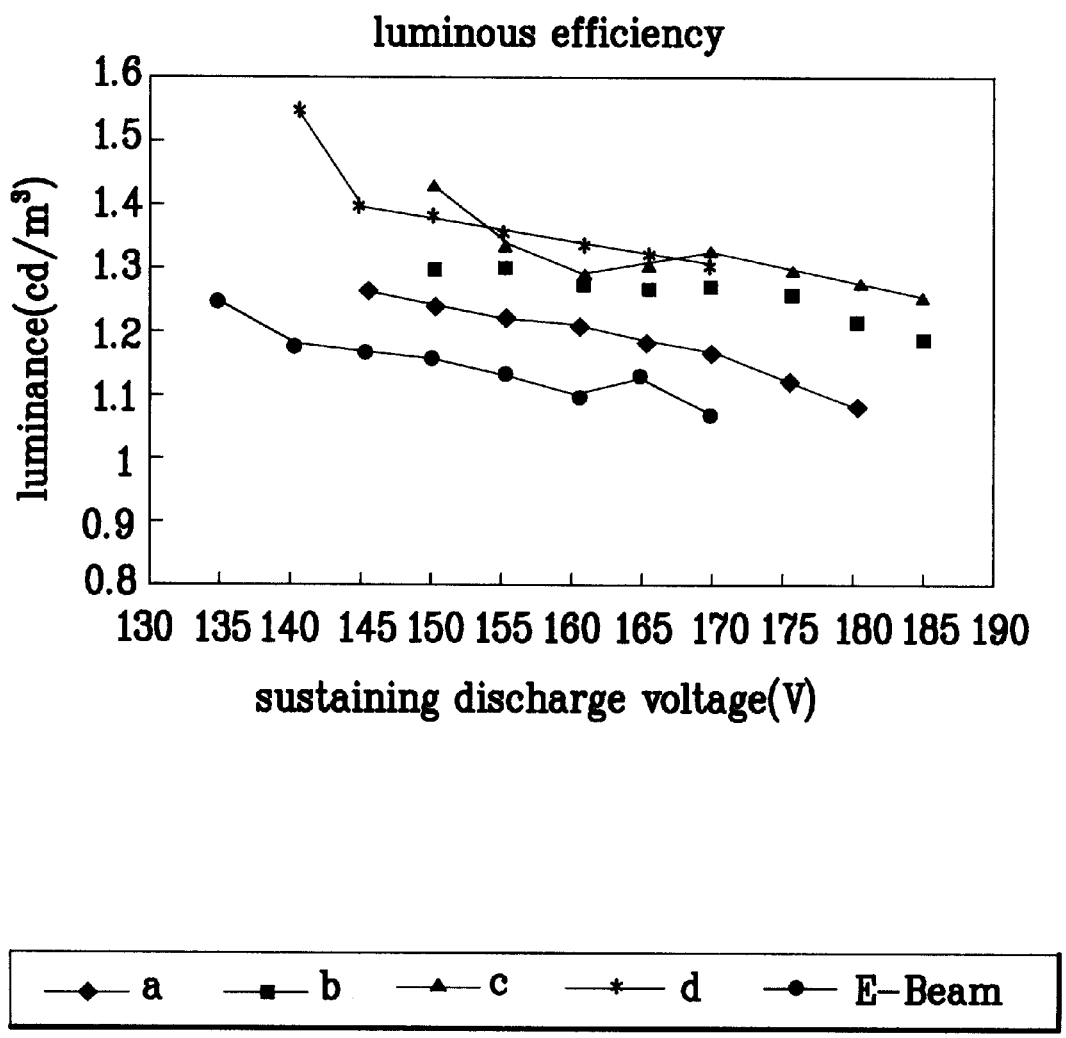
FIG. 6 illustrates a graph showing a luminous efficiency vs. a sustain voltage of a plasma display panel employing protection films of the present invention and the related art, respectively.

FIG. 6 illustrates a graph showing a luminous efficiency vs. a sustain voltage of a plasma display panel employing protection films of the present invention and the related art respectively, wherefrom it can be known that the protection film of the plasma display panel of the present invention enhances the luminous efficiency higher than the related art E-beam formed protection film.

Figure 7:
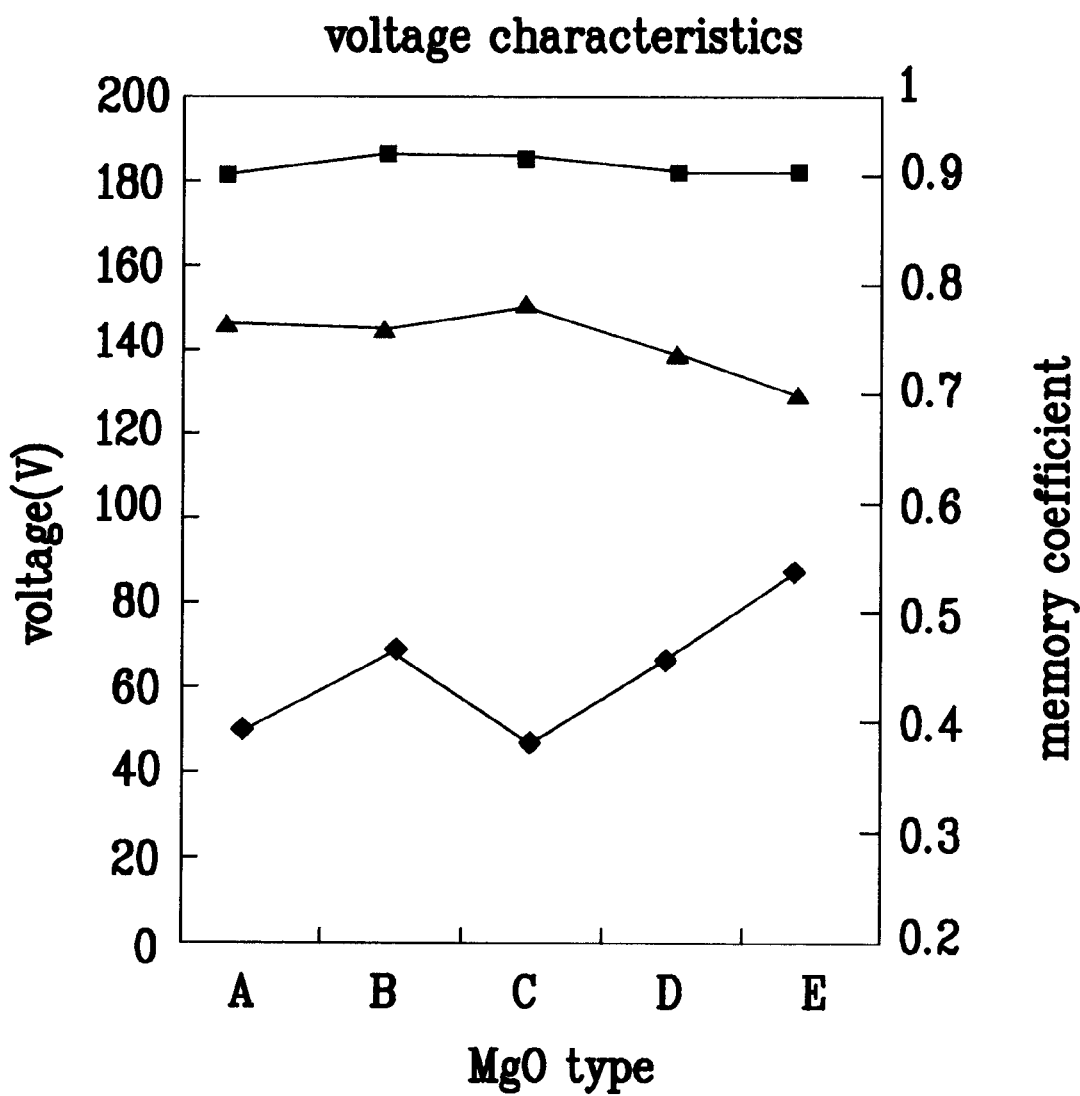
FIG. 7 illustrates a graph showing sustain voltage characteristics of a plasma display panel employing protection films of the present invention and the related art, respectively; and, FIG. 8 illustrates a graph showing a luminance vs. a discharge current of a plasma display panel employing protection films of the present invention and the related art, respectively.

FIG. 7 illustrates a graph showing sustain voltage characteristics of a plasma display panel employing protection films of the present invention and the related art respectively, wherefrom it can be known that, though the related art protection film exhibits high voltage characteristics at a low voltage, the protection film of the present invention exhibits voltage characteristics higher than the related art.

Figure 8:
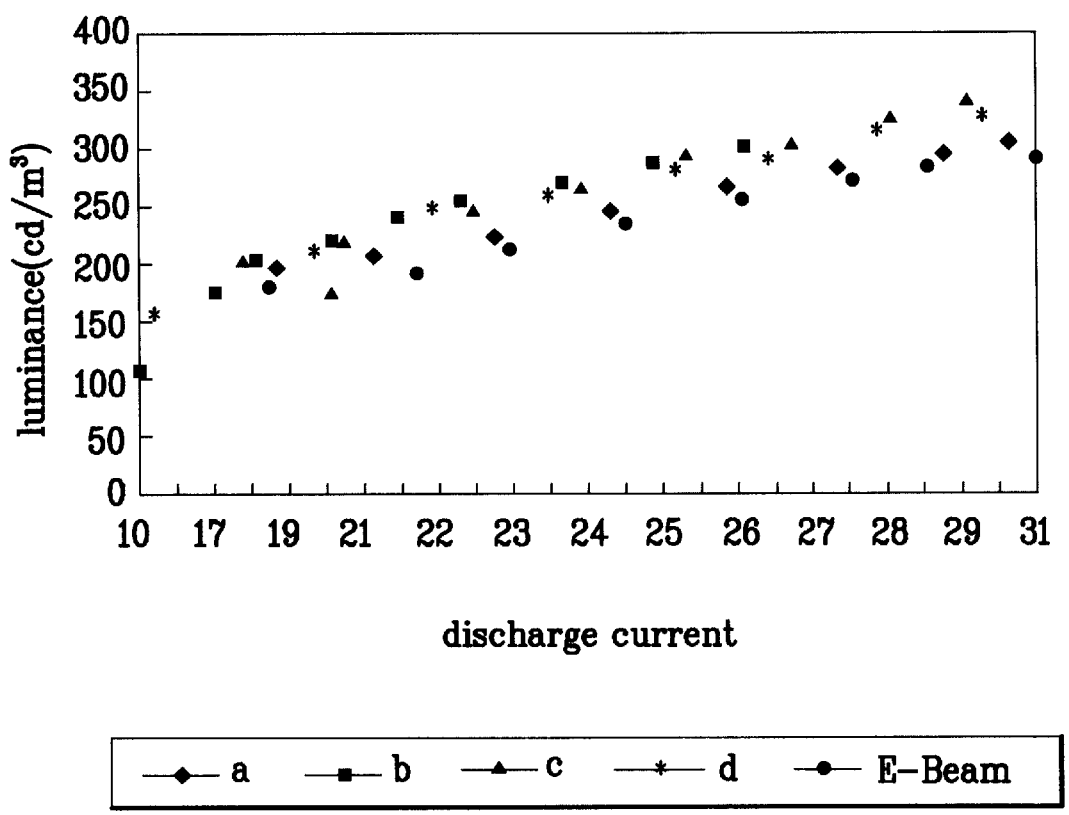

FIG. 8 illustrates a graph showing a luminance vs. a discharge current of a plasma display panel employing protection films of the present invention and the related art respectively, wherefrom it can be known that, if the same discharge voltages are provided, the protection film of the present invention exhibits a luminance higher than the related art E-beam formed protection film.

As has been explained, the protection film composition for a plasma display panel has the following advantages.

First, a plasma display panel having the protection film of the present invention exhibits a luminance higher than a plasma display panel having the related art protection film.

Second, a discharge current and a discharge voltage of the present invention can be lower than the same of the related art on the same luminance basis.

Third, different from a general liquid composition, the composition of the present invention is stable to moist, and more transparent than the related art composition because magnesium 2-methoxyethoxide which has a high bonding force is contained, and an alkaline earth metal oxohydroxide $O_y(OH)_{2x-2y}$ polymer precursor which can prevent damage caused by contraction of magnesium oxide MgO thin film is employed as a main component.

Fourth, a magnesium oxide film can be formed, which has a high bonding force, forms no pin hole or crack, and has an excellent electrical characteristics.

It will be apparent to those skilled in the art that various modifications and variations can be made in the protection film composition for a plasma display panel of the present invention without departing from the spirit or scope of the invention. Thus, it is intended that the present invention cover the modifications and variations of this invention provided they come within the scope of the appended claims and their equivalents.

What is claimed is:

1. A protection film composition for a plasma display panel consisting of:
    a metal oxide including 60 wt %~90 wt % of magnesium 2-methoxyethoxide, and 10 wt %~40 wt % of metal polyoxohydroxide; and,
    an organic solvent.

2. A protection film composition as claimed in claim 1, wherein the metal oxide is mixed at a ratio below 10 wt % of an entire mixture mixed with the organic solvent.

3. A protection film composition as claimed in claim 2, wherein the metal oxide includes magnesium oxide added by below 3 wt % to 10 wt % of the entire metal oxide.

4. A protection film composition as claimed in claim 2, wherein the metal oxide includes magnesium oxide added by below 3 wt % to 10 wt % of the entire metal oxide, and calcium hydroxide added by 0.5 wt %~2 wt % to 10 wt % of the entire metal oxide.

5. A protection film composition as claimed in claim 2, wherein the metal oxide includes magnesium oxide added by below 3 wt % to 10 wt % of the entire metal oxide, and calcium hydroxide added by one wt % to 10 wt % of the entire metal oxide.

6. A protection film composition as claimed in claim 2, wherein the metal oxide includes magnesium oxide added by below 3 wt % to 10 wt % of the entire metal oxide, and barium hydroxide added by 0.5 wt %~2 wt % to 10 wt % of the entire metal oxide.

7. A protection film composition as claimed in claim 2, wherein the metal oxide includes magnesium oxide added by below 3 wt % to 10 wt % of the entire metal oxide, and barium hydroxide added by one wt % to 10 wt % of the entire metal oxide.

8. A protection film composition as claimed in claim 2, wherein the metal oxide includes calcium hydroxide added by 0.5 wt %~2 wt % to 10 wt % of the entire metal oxide.

9. A protection film composition as claimed in claim 2, wherein the metal oxide includes calcium hydroxide added by one wt % to 10 wt % of the entire metal oxide.

10. A protection film composition as claimed in claim 2, wherein the metal oxide includes barium hydroxide added by 0.5 wt %~2 wt % to 10 wt % of the entire metal oxide.

11. A protection film composition as claimed in claim 2, wherein the metal oxide includes barium hydroxide added by one wt % to 10 wt % of the entire metal oxide.

12. A protection film composition as claimed in claim 1, wherein the metal polyoxohydroxide can be expressed in a general formula $M_xO_y(OH)_{2x-2y}$, where x is '1', and y is '0' or '1'.

13. A protection film composition as claimed in claim 12, wherein the 'M' in the general formula denotes magnesium, x is '1', and y is '0' or '1'.

14. A protection film composition as claimed in claim 12, wherein the 'M' in the general formula denotes calcium, x is '1', and y is '0' or '1'.

* * * * *